Dec. 11, 1956   H. W. LEVERENZ   2,774,003
COLOR TELEVISION KINESCOPES
Filed Dec. 20, 1952   2 Sheets-Sheet 1
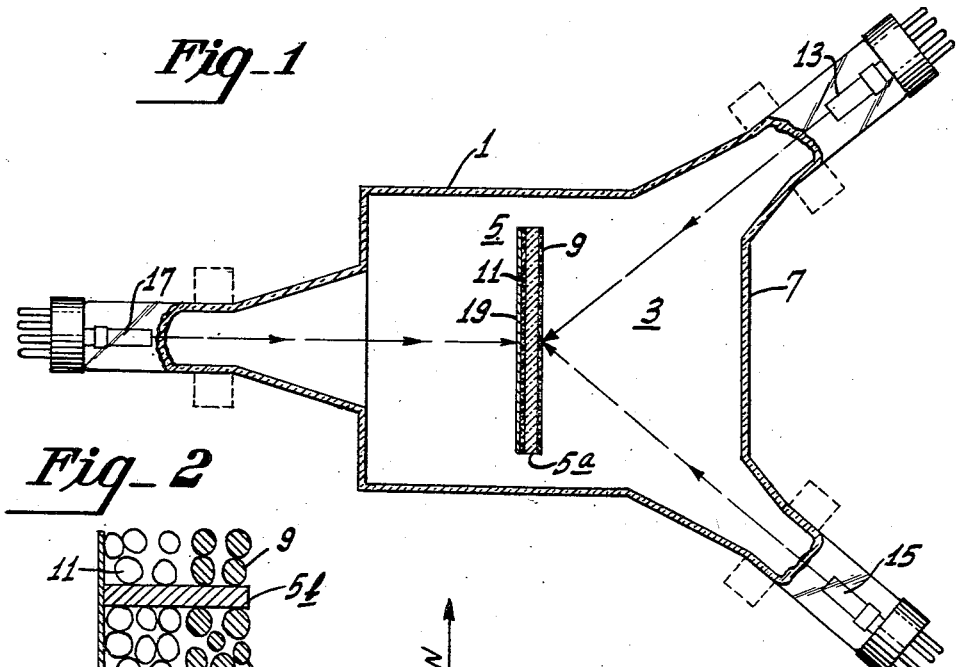
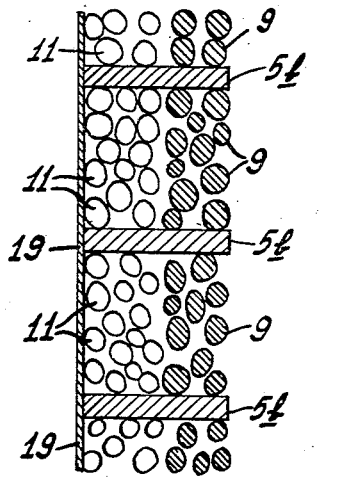
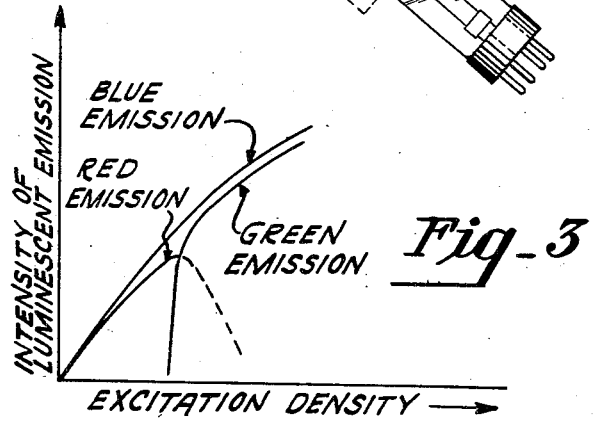
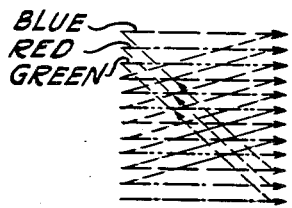
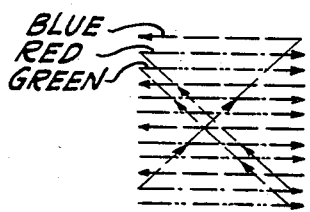
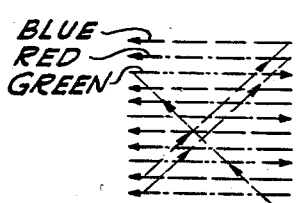
INVENTOR.
HUMBOLDT W. LEVERENZ
BY Roderick Malcolm
ATTORNEY Dec. 11, 1956
H. W. LEVERENZ
2,774,003
COLOR TELEVISION KINESCOPES
Filed Dec. 20, 1952
2 Sheets-Sheet 2
Fig_7
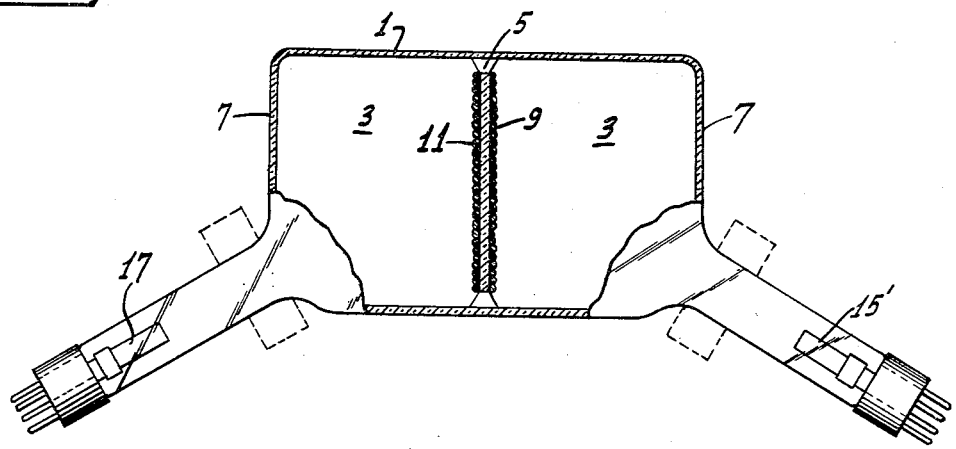
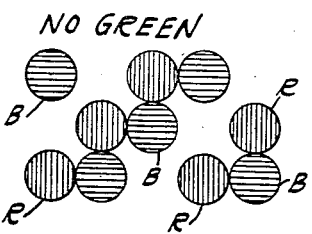
Fig_8
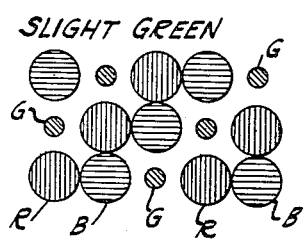
Fig_9
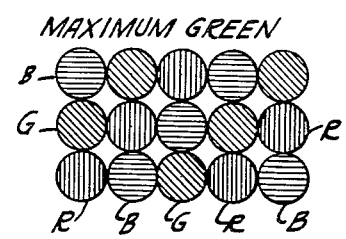
Fig_10
INVENTOR.
HUMBOLDT W. LEVERENZ
BY
ATTORNEY

United States Patent Office 2,774,003
Patented Dec. 11, 1956

2,774,003

COLOR TELEVISION KINESCOPES

Humboldt W. Leverenz, Princeton, N. J., assignor to Radio Corporation of America, a corporation of Delaware Application December 20, 1952, Serial No. 327,102

9 Claims. (Cl. 313—92)

This invention relates to electron-sensitive screens for the reproduction of television, radar and similar images in two or more colors.

The image-reproducing screens used in present day color-kinescopes usually comprise an electron-sensitive target surface made-up of a multiplicity of systematically arranged dot-like or line-like phosphor covered areas of different color-response characteristics. The difficulties incident to plotting and laying down a multiplicity of discrete phosphor areas of sub-elemental image-dimensions render such screens quite costly. This is especially so where (as in Schroeder U. S. Patent 2,595,548) an auxiliary electrode or "mask" is provided adjacent to the target surface of the screen for confining the actuating beam or beams to the particular color area or areas that have been selected for illumination.

Efforts to provide less costly color-screens by the use of a plurality of super-imposed ("bi-planar" or "tri-planar") color-phosphor layers which are adapted to be excited, selectively, by beams of different velocities, have not been successful probably because of the difficulties encountered in limiting the penetration of the beam-electrons to the selected color-layer or layers. The use of "barrier" layers between the phosphor-layers (see Koller et al. 2,590,018) is said to be advantageous, but certainly adds to the cost and complexity of such color-screens.

Another seemingly possible solution to the problem of providing a low-cost color-screen, found in the prior art (see Wilson 2,343,825), involves the use of a screen coating consisting of a mixture of phosphors having different emission colors and different saturation characteristics, as a function of beam-current density. One trouble with such "single layer mixed-phosphor screens" is that when the current density (of the actuating beam) is higher than that required to saturate one of the phosphors, then that portion of the beam energy which is absorbed by said phosphor is wasted. Another serious objection is that in any mixture composed of two or more phosphors a substantial portion of the light emitted by one phosphor is reflected and absorbed by the other or others.

Accordingly, the principal object of the present invention is to obviate the foregoing and other less apparent objections to present day color-tubes and, more particularly, to provide a simple, inexpensive and trouble-free color-screen, and one further characterized (a) by its efficient use of the beam-current, (b) its relative freedom from light-absorption and by (c) the purity and brilliance of its colors.

The foregoing and related objects are achieved in accordance with the invention by the provision of a single-layer screen coating constituted, essentially, of a single phosphor material of a type capable of alternately and repeatedly emitting light of one primary color (e. g., red) under one excitation density and light of a different primary color (e. g., green) under a different excitation density. The term "excitation density" is defined as: the number of excitant free-energy "bits" (each capable of producing a luminescence photon) per unit of excited volume per unit of time—mainly within the lifetime (or half-life) of the excited states of the phosphor.

The invention is herein described as applied to a tri-color (e. g., red, blue and green) screen comprising a transparent foundation member covered on one of its major or "target" surfaces with a dual-color single phosphor and, on its opposite target surface, with a single-color phosphor. However, it will be obvious as the description proceeds that the single-color phosphor may be applied (as in a "mosaic" screen) to the same side of the screen as the two-color phosphor, or that the single-color phosphor may be omitted where only two colors are required.

The invention is described in greater detail in connection with the accompanying two sheets of drawings wherein:

Fig. 1 is a side elevation, partly broken away, of a 3-gun tri-color kinescope containing a 2-sided color-screen embodying the invention;

Fig. 2 is a fragmentary sectional view greatly magnified, of an alternative form of two-sided color-screen, the separate phosphors being contained in the interstices of a foraminous foundation plate or fabric;

Fig. 3 is a chart showing the modulation characteristics of the three primary-color emissions from the two-phosphor screen of Figs. 1 and 2;

Figs. 4 to 6 inclusive comprise a series of three separate patterns in which the two-sided three-color screen of Figs. 1, 2 and 10 may be scanned with beams of constant diameter to produce an additive tri-color image;

Fig. 7 is a view similar to Fig. 1 but showing the invention as applied to a 2-gun tri-color kinescope.

Figs. 8 to 10 comprise a series of three separate patterns in which the three-color screens of Figs. 1, 2 and 7 may be scanned with beams of variable diameter to produce an additive tri-color image.

In Fig. 1, 1 designates generally, an evacuated envelope having a viewing chamber 3 containing a two-sided color-phosphor screen 5, and a window 7 through which the said screen may be observed. The oppositely located phosphor-coated target surfaces 9 and 11 of the two-sided screen 5 are arranged to be excited, in a variety of ways, later described, by three electron-guns 13, 15 and 17; two of which are directed upon its front surface 9, and one upon its rear surface 11. The base or "foundation member" of the color-screen 5 may comprise either a glass plate 5a, as shown in Fig. 1, or a metal plate or fabric of open-work construction, as shown at 5b in Fig. 2. In the latter case, the oppositely located phosphor layers 9 and 11 fill the apertures in the foraminous support member 5b. The target surface of the rear phosphor coating 11 is provided with an electron-transparent metal (e. g., aluminum) coating 19 which serves as a reflector for directing the light-output of the screen toward the window 7.

As in other two-sided color-screens (e. g., Geer 2,489,848) the phosphors are preferably so chosen that the light emitted by one phosphor coating (say, coating 11) undergoes no noticeable change in hue in passing through the other coating (9). Of course, when a corresponding area of said other coating is emitting light of a different color the two colors will be blended in the eyes of the observer.

Assuming now that the coating 11 on the rear surface of the screen-plate consists essentially of a blue-emitting phosphor, such as silver-activated hexagonal zinc sulphide (hex-ZnS:Ag), and that the front surface 9 of the screen consists essentially of a two-color phosphor, such as hexagonal cadmium sulphide containing a [presumed] excess of cadmium (hex CdS:[Cd]) capable, selectively, of emitting red and green light, it will be apparent that the kinescope illustrated in Fig. 1 can be made to produce all three primary colors, simultaneously, and hence to reproduce television images in full color. Thus, the blue portions of such a full-color image are produced by an electron beam from gun 17 scanning the blue-emitting rear surface 11 of the screen while the beam current is modulated to correspond with the blue content of the image being televised. The red image is reproduced in similar fashion by an electron beam from gun 13 scanning (in this example) the hex.-CdS:[Cd] phosphor surface 9, which emits red-orange light under excitation densities from zero up to a moderate value. The green image similarly is reproduced by a scanning beam from another gun 15, except that this beam is made to provide either no electrons or a range of high excitation densities which cause the green edge-emission band of the hex.-CdS:[Cd] phosphor coating 9 to appear, rather than the red emission which prevails at the low excitation densities provided by the "red" gun 13.

When these scannings and modulations are accomplished rapidly, for example, each different color image being reproduced at 60 fields and 30 frames per second (interlaced), the resultant image appears in flicker-free color and can be made to provide half-tones of black and white as well as the primary colors and their additive combinations.

The present invention is not especially concerned with the various types of circuits which may be employed, in conjunction with the tube of Fig. 1, for the reproduction of such images, as such circuits are known to those skilled in the television art. However, it is pointed out that the required variation of excitation density can be obtained in any of the following ways:

(1) Grid-controlled variation of beam current; keeping other variables substantially constant (this is the preferred practice).

(2) Variation of beam diameter (area). This may be done by modulating the focusing electrode, e. g., the first anode, or the magnetic focusing coil.

(3) Variation of the beam-scanning rate to allow the beam to remain longer on the elemental areas which are to be given high excitation densities, and for shorter intervals on elemental areas to be given low excitation densities.

(4) Variation of beam-accelerating voltage, e. g., by modulating the second anode potential. For constant beam power (or current) an increase in beam voltage decreases the excitation density per unit excited volume in the phosphor crystals because the penetration of the beam increases as the square (2nd power) of the accelerating voltage.

Combinations of the above techniques for varying the excitation density of the two-color phosphor 9 may also be used.

It should be also noted that it is possible to have, for example, the electron-beam from the "green" gun 15 trace closely after the beam from the "red" gun 13 so that a given elemental area on the target 9 produces a brief pulse of red light and is then further excited to produce green light by the following "green" beam. This method of rapid follow-up scanning uses a cumulation of excitation density derived in part from the red beam and in part from the green beam.

The scansions performed by the red, green and blue beams may be virtually superimposed (see previous paragraph) to produce the desired resultant color and intensity from a given elemental screen area almost simultaneously. Alternatively, the three beams may be made to trace their different color images such that their scanning patterns are:

(a) Duplicates of each other, but out-of-phase, as indicated by the three interleaved scanning lines, viewed edge-on in Fig. 4;

(b) Independent scanning patterns which may or may not have some common features or segments;

(c) Arranged so the different colored images are: (1) superimposed on each elemental area of the order of the beam areas, or (2) interlaced as lines which are each fine enough to be not discernible at a normal viewing distance, or (3) interlaced as dots whose areas are substantially no larger than the area of the beam, or (4) interlaced as dots and lines, such as in the system outlined with a trinoscope by the Radio Corporation of America (RCA) at the 1949 hearings before the Federal Communications Commission (F. C. C.).

It is possible with the structure shown in Fig. 1 to have, for example, the blue-image beam-spot spatially superimposed on one of the spots produced by the other two beams, or to allow the blue spot to trace the intermediate positions of the other two spots. Also, the blue-beam may trace its pattern in the same or the opposite sequence as the red or green beams. The red and the green beams may also trace in the same sequence, as shown by the arrows R and G in Fig. 5, or in the opposite sequence as indicated by the similarly lettered arrows in Fig. 6.

When it is desired to use only two electron guns, one on each side of the two-sided screen, as shown in Fig. 7, then the gun 15' for the two-color phosphor 9 must be controlled to produce both the red and the green color images. This may be done by switching the beam from said gun (15') from the low to the high excitation-density range (see Fig. 3) in frame, field, line, or dot sequence, or by combinations of these.

As shown in Fig. 3, the intensity of blue-light emission from the single-color phosphor increases monotonically with increasing excitation density. The red-light emission, from the dual-color phosphor, increases up to a certain excitation density beyond which the green-light emission appears rapidly and effectively supersedes the initial red-light emission.

In all of the color-image reproduction methods herein described it is desirable to have:

(1) Each elemental image area reproduces all three of the primary colors in all desired intensities during every field or frame interval, or (2) to have each elemental image area reproduce one or two of the primary colors within each field or frame interval, and to make the scanning and sequencing-of-colors alternate with the colors on a given elemental area in subsequent fields or frames.

A close inspection of the modulation-characteristic curves of Fig. 3 reveals that low intensities of green emission may be difficult to achieve by merely changing the beam-current of a beam spot of constant size, or by changing beam spot size at constant beam current. Because the green emission, to appear at all, requires high excitation density it is usually preferable to employ a combination of (1) modulating beam current and (2) beam area, to produce (within an image area resolvable by the eye at normal viewing distance) all intensities of green emission from zero to highlight values. As an example, consider an electron-beam whose current density per unit cross-sectional area (perpendicular to the flow of electrons) is maintained substantially constant while its spot size is varied in the sense that "no green output" corresponds to "zero spot size" and "high green output" corresponds to a "large spot size" (and where the largest required spot size does not greatly exceed the size resolvable by a normal image viewer). Then, for a dot-interlaced image element with constant blue and red image-element output a portion of the image could be constructed in the patterns shown in Figs. 8 to 10 inclusive.

Hex.-CdS: [Cd], above mentioned as illustrative of a typical dual-color single phosphor, ordinarily exhibits but a single-color response-characteristic, i. e., red. To bring out its second color (green) response the material can be subjected to a temperature of about 1000° C. for a period of from, say, ten minutes to, say, ten hours, and cool the product. Similar thermal treatments will endow certain other single-color phosphors with a second color-response characteristic. By way of example: hexagonal zinc oxide (ZnO) when heated (in hydrogen or carbon monoxide) will endow this normally "green phosphor" with a second (blue) color-response. It is of course obvious that when this latter material (hex.-ZnO: [Zn]) is employed in a tri-color tube, the third or single-color phosphor required to achieve a tri-color additive image should exhibit a different color-response (e. g., "red") characteristic. A typical "red" phosphor, suitable for this purpose is copper activated cubic zinc selenide cub.-(ZnSe:Cu).

The two-and-three-color television screens of the present invention do not require accurate line or dot interlacing; in fact, the different color-images may shift their scanning patterns relative to each other by amounts of the order of magnitude of the visually (normally) resolvable linear elements in the image without unduly impairing the quality of the image. This operational advantage, coupled with the fact that the color-screens and kinescopes of the invention lend themeselves readily to mass-production, recommend their use in any and all types (e. g., "frame," "line" and "dot" sequental) of color-television systems.

What is claimed is:

1. In combination, an electron-sensitive screen comprising a surface area constituted essentially of a single phosphor material of a type capable of alternately and repeatedly emitting light of one color under one excitation density and light of a different color under a different excitation density, and means for bombarding said single phosphor material selectively with energy of said different excitation densities.

2. In combination, an electron-sensitive screen comprising a first surface area constituted essentially of a single phosphor material of a type capable of alternately and repeatedly emitting light of one color under one excitation density and light of a second color under a different excitation density, means for bombarding said first surface area selectively with energy of said different excitation densities, a second surface area constituted essentially of a phosphor material that emits light of still another color when subjected to electron-bombardment, and means for subjecting said second surface area to electron-bombardment.

3. The invention as set forth in claim 2 and wherein said screen comprises a transparent foundation member having oppositely located major faces, said first surface area lying adjacent to one of said major faces and said second surface area lying adjacent to the other of said major faces substantially in register with said first surface area.

4. The invention as set forth in claim 3 and wherein said transparent foundation comprises a foraminous member and said phosphor materials are supported within the apertures of said foraminous member.

5. The invention as set forth in claim 3 wherein said transparent foundation member comprises a glass plate.

6. In combination, an electron-sensitive screen comprising a surface area constituted essentially of a single phosphor material of a type capable of alternately and repeatedly emitting light of one primary color selected from the group of red, blue and green under one excitation density and light of a different one of said primary colors under a different excitation density, and means for bombarding said single phosphor material selectively with energy of said different excitation densities.

7. The invention as set forth in claim 6 and wherein said single phosphor material is constituted essentially of hexagonal cadmium sulphide.

8. The invention as set forth in claim 6 and wherein said single phosphor material is constituted essentially of hexagonal zinc oxide.

9. The invention as set forth in claim 6 and wherein said screen comprises a second surface area constituted essentially of a phosphor material that emits light of another different one of said primary colors when subjected to electron-impact, whereby said screen is adapted to reproduce all three of said primary colors, and means for subjecting said second surface area to electron-bombardment.

References Cited in the file of this patent

UNITED STATES PATENTS

| | | |
|---|---|---|
| 2,403,227 | Leverenz | July 2, 1946 |
| 2,440,301 | Sharpe | Apr. 27, 1948 |
| 2,446,764 | Henderson | Aug. 10, 1948 |
| 2,480,848 | Geer | Sept. 6, 1949 |
| 2,684,885 | Nakken | July 27, 1954 |

FOREIGN PATENTS

| | | |
|---|---|---|
| 562,168 | Great Britain | June 21, 1944 |